B. L. BOBROFF.
TELEGRAPHY.
APPLICATION FILED FEB. 9, 1914.

1,144,290.

Patented June 22, 1915.
2 SHEETS—SHEET 1.

Witnesses:

Inventor
Barnett L. Bobroff.
By Oliphant & Young
Attorneys.

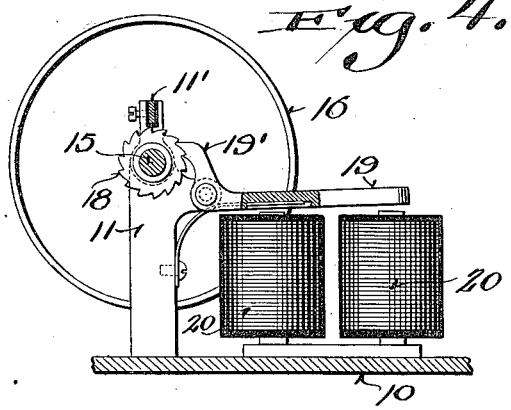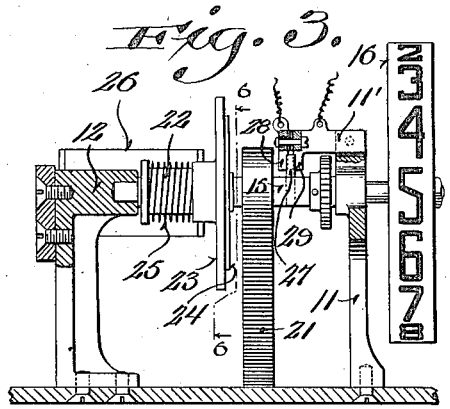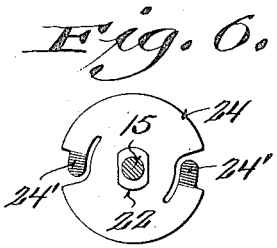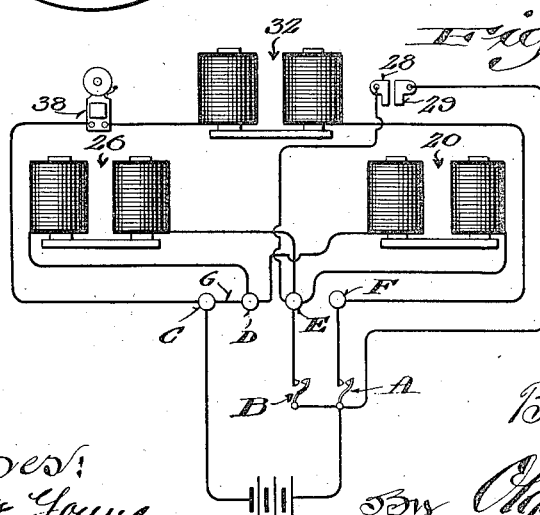

UNITED STATES PATENT OFFICE.

BORNETT L. BOBROFF, OF MILWAUKEE, WISCONSIN, ASSIGNOR, BY DIRECT AND MESNE ASSIGNMENTS, TO UNIVERSAL INDICATOR COMPANY, OF MILWAUKEE, WISCONSIN, A CORPORATION OF WISCONSIN.

TELEGRAPHY.

1,144,290.           Specification of Letters Patent.     Patented June 22, 1915.

Application filed February 9, 1914. Serial No. 817,541.

*To all whom it may concern:*

Be it known that I, BORNETT L. BOBROFF, a citizen of the United States, and resident of Milwaukee, in the county of Milwaukee and State of Wisconsin, have invented certain new and useful Improvements in Telegraphy; and I do hereby declare that the following is a full, clear, and exact description thereof.

My invention consists in what is herein particularly set forth with reference to the accompanying drawings and pointed out in the claims of this specification, its object being to provide simple, economical, durable and efficient dial telegraph apparatus applicable for many uses and not liable to get out of order.

Figure 1:
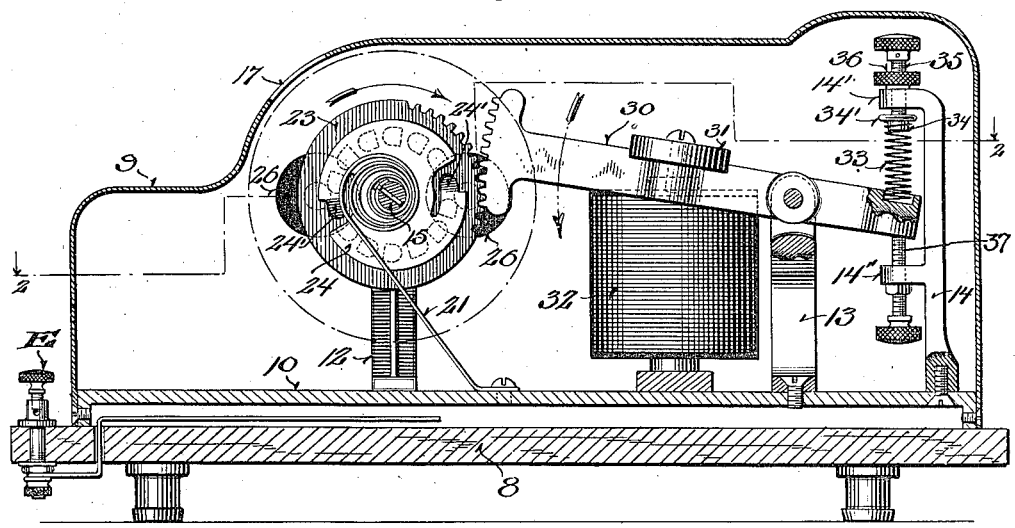
Figure 2:
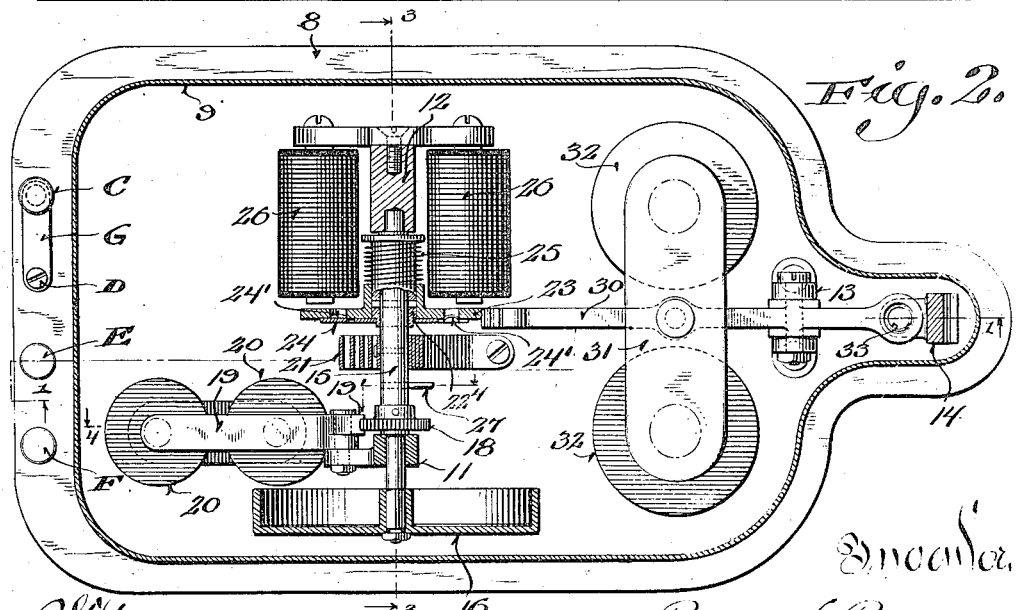

Figure 1 of the drawings represents a partly sectional elevation of an incased dial telegraph apparatus in accordance with my invention, the section being indicated by line 1—1 in the next described illustration; Fig. 2, a plan view of the same partly in horizontal section as indicated by line 2—2 in Fig. 1; Fig. 3, a cross-section indicated by line 3—3 in Fig. 2; Fig. 4, a partly sectional elevation of a detail of the apparatus indicated by line 4—4 in Fig. 2; Fig. 5, a side elevation of the dial of the apparatus; Fig. 6, a partly sectional elevation of a detail of the apparatus indicated by line 6—6 in Fig. 3, and Fig. 7, a diagram illustrating electric-wiring of the apparatus.

Referring by numerals and letters to the drawings, 8 indicates a stand upon which my improved dial telegraph apparatus is suitably secured for the most part within a casing 9, but the apparatus may be arranged upon any suitable support.

Mounted on the support 8 is a base 10, and in rigid connection with the base are suitably disposed standards 11, 12, 13 and 14. Journaled in the standards 11 and 12 is a spindle 15 and detachably secured in rigid connection with the spindle is a dial 16 observable through openings provided in the casing 9 one of these openings being shown at 17 in Fig. 1. Words and numerals are shown displayed at regular intervals upon the periphery of the dial and similar words and numerals are shown correspondingly displayed at intervals of a circle upon the face of said dial. However other words and characters may be substituted for those aforesaid, or the words may be omitted and only characters employed, said characters in any event being indices of a code to be employed as an adjunct to the herein described telegraph apparatus.

Fast on the spindle is a ratchet-wheel 18 engaged by a detent-end 19' of a spring-controlled armature 19 of an electro-magnet 20, this magnet being energized to effect a disengagement of the detent from said ratchet-wheel. Fastened to the base 10 and the spindle 15 are the ends of a flat helix spring 21, and a flanged sleeve 22 is also fast on said spindle. Loose on the sleeve is a rack-wheel 23 provided at regular intervals of a circle with notches or apertures corresponding in number to the indices of the aforesaid dial, and slipped on an angular reduced end of said sleeve is a disk 24 having diametrically opposite spring tongues 24' engageable with the apertures in the rack-wheel, whereby the disk becomes a clutch with which said rack-wheel has slip-engagement. Arranged on the sleeve 22, between its flange and the hub of the rack-wheel, is a spiral-spring 25, and an electromagnet 26 in connection with the standard 12 is energized to separate said rack-wheel from the clutch-disk 24.

A pin 27 in connection with the spindle 15 is a contact designed to close against or bridge a pair of other contacts 28, 29, in its path, this pair of contacts being in insulated connection with one another at one end of an arm 11' of the standard 11.

Engaging the teeth of the rack-wheel 23 is a segmental rack-end of a lever 30 in connection with the armature 31 of an electromagnet 32, the lever being fulcrumed in a fork of the standard 13. The other end of the lever is provided with a seat for a spiral-spring 33 opposed to a flange 34' of a centering button 34 fast on the end of tensioning screw 35 engaging an arm 14' of the standard 14, a binding-nut 36 being provided on the screw in opposition to said arm. A screw 37 is provided in another arm 14" of the standard 14 in opposition to the lever 30, and the adjustment of this screw regulates the throw of said lever when the magnet 32 is energized, said lever being returned to normal position by expansive force of the spring 33 when said magnet is deënergized.

In practice it is intended that an arbitrarily selected index of the dial shall be normally at a predetermined suitably indicated position and observable through an aperture or apertures provided in the casing 9 if the latter or its equivalent be employed.

The closing of an electric-circuit by means of a push button A will cause an energization of magnet 32 to actuate the lever 30 and thus move the dial 16 one step through the medium of the rack-lever 30 in engagement with the rack-wheel 23 clutched in connection with the spindle 15. The circuit through the magnet being broken the lever 30 is automatically returned to position by the means aforesaid, there being slip of the rack-wheel upon the clutch-disk 24, but the dial 16 remains in its adjusted position, because of the engagement of the detent 19' with the ratchet-wheel 18 of the spindle aforesaid. By closing and opening of the push-button A a step by step rotation is imparted to the dial, until the desired index thereon is brought to the reading point, then by reference to his code the reader has the information intended to be communicated from the point at which said push-button is located. If desired an electric-bell 38 or other audible signal may be placed in circuit with the electro-magnet 32 to call attention to movements of the dial.

To return the dial to normal position, another push-button B distant from said dial is actuated to close electric-circuits by which to energize the electro-magnets 20 and 26, the result being a disengagement of the detent 19' from the ratchet-wheel 18, and a retraction of the rack-wheel 23 from the clutch-disk 24, whereupon the previously wound spring 21 reacts to impart the desired reverse movement to the aforesaid dial. This return of the dial is automatically effected when, upon a full revolution of said dial, the pin 27 of the spindle 15 closes on the contacts 28 and 29 to thereby close electric-circuits in which the magnets 20, 26, are located, it being understood that the circuit through the magnet 32 is also closed at the time said pin closes on said contacts.

The various circuits may be readily traced in Fig. 7, and the connections C, D, E and F of the wiring are also shown in Fig. 2, said connections C and D being bridged as shown at G in Figs. 2 and 7.

The dial shown has the words "In" and "Out" displayed thereon and the apparatus being located at a bulletin board in an office building, and the party elsewhere in the building having control of said apparatus may readily effect an adjustment of said dial to indicate his presence or absence.

The numerals, 1 to 12 inclusive, also displayed on the dial are designed to serve as indices for the code to which reference is had in the foregoing. The dial apparatus herein set forth forms part of my application Serial No. 849266, filed July 6, 1914.

I claim:

1. A telegraph apparatus comprising a spindle and its bearings, a ratchet-wheel fast on the spindle, an electro-magnet provided with an armature having a detent-end engageable with the ratchet-wheel, a spring-controlled sliding rack-wheel in clutch-connection with the spindle, an electro-magnet by which to draw the rack-wheel out of clutch against spring resistance, a rack-lever engaging said rack-wheel, an electro-magnet having the armature thereof in connection with the lever, a dial fast on said spindle and provided with indices at regular intervals of a circle thereon, means under control at a distant point for energizing the last named magnet separately and for simultaneously energizing the other two of the magnets, and means for effecting an automatic reverse movement of the spindle out of clutch with said rack-wheel.

2. A telegraph apparatus comprising a spindle and its bearings, a ratchet-wheel fast on the spindle, an electro-magnet provided with an armature having a detent-end engageable with the ratchet-wheel, a spring-controlled sliding rack-wheel in clutch-connection with the spindle, an electro-magnet by which to draw the rack-wheel out of clutch against spring resistance, a rack-lever engaging said wheel, an electro-magnet having the armature thereof in connection with the lever, a dial fast on said spindle and provided with indices at regular intervals of a circle thereon, means under control at a distant point for energizing the last named magnet separately, means for simultaneously energizing the detent and wheel control magnets, means for effecting an automatic reverse movement of the partly revolved spindle out of clutch with said rack-wheel, and a contact in connection with the said spindle for automatically closing electric circuits through said detent and wheel control magnets when said spindle completes a revolution.

3. A telegraph apparatus comprising a spindle and its bearings, a ratchet-wheel fast on the spindle, an electro-magnet provided with an armature having a detent-end engageable with the ratchet-wheel, a helical spring connected at its ends to the spindle and a fixed part of the apparatus, a spring-controlled sliding rack-wheel in clutch-connection with the spindle, an electro-magnet by which to draw the rack-wheel out of clutch against spring resistance, a rack-lever engaging said rack-wheel, an electro-magnet having the armature thereof in connection with the lever, a dial fast on said spindle and provided with indices at regular intervals of a circle thereon, and means under control at a distant point for energizing the last named magnet separately and for simultaneously energizing the other two of the magnets.

4. A telegraph apparatus comprising a spindle and its bearings, a ratchet-wheel fast on the spindle, an electro-magnet provided with an armature having a detent-end engageable with the ratchet-wheel, a flanged sleeve fast on the spindle, a disk rigid with the sleeve and having spring-tongues struck out therefrom to form a clutch, a rack-wheel loose on the sleeve to have slip engagement with the clutch, a spring on said sleeve between the flange thereof and the rack-wheel hub, an electro-magnet by which to draw the rack-wheel out of clutch against spring resistance, a rack-lever engaging said rack-wheel, an electro-magnet having the armature thereof in connection with the lever, a dial fast on said spindle and provided with indices at regular intervals of a circle thereon, means under control at a distant point for energizing the last named magnet separately and for simultaneously energizing the other two of the magnets, and means for effecting an automatic reverse movement of the spindle out of clutch with said rack-wheel.

In testimony that I claim the foregoing I have hereunto set my hand at Milwaukee in the county of Milwaukee and State of Wisconsin in the presence of two witnesses.

B. L. BOBROFF.

Witnesses:
H. E. OLIPHANT,
H. S. CENTROVITZ.